United States Patent [19]
Colyer

[11] Patent Number: 5,885,127
[45] Date of Patent: Mar. 23, 1999

[54] WILD GAME CALLER

[76] Inventor: Joseph M. Colyer, 8 Redwing Ct., Jacksonville, Ark. 72076

[21] Appl. No.: 892,622

[22] Filed: Jul. 15, 1997

[51] Int. Cl.[6] .............................. A63H 5/00; G10D 7/00
[52] U.S. Cl. ..................... 446/208; 446/404; 446/416; 84/330
[58] Field of Search .................... 446/208, 209, 446/207, 202, 397, 404, 408, 416; 43/2, 3; 84/330, 383 R, 400

[56] References Cited

U.S. PATENT DOCUMENTS

| | | | |
|---|---|---|---|
| 2,700,316 | 1/1955 | Gorden et al. | 446/202 X |
| 2,782,558 | 2/1957 | Harley | 446/207 |
| 2,835,077 | 5/1958 | Mittelsteadt | 446/208 |
| 3,722,133 | 3/1973 | Morgan | 446/202 |
| 3,811,221 | 5/1974 | Wilt | 446/202 |
| 3,815,283 | 6/1974 | Piper | 446/202 |
| 3,991,513 | 11/1976 | Faulk . | |
| 4,576,584 | 3/1986 | Hill | 446/203 X |
| 4,950,198 | 8/1990 | Repko, Jr. | 446/207 |
| 5,090,937 | 2/1992 | LaRue et al. . | |

*Primary Examiner*—Kien T. Nguyen
*Assistant Examiner*—D. Neal Muir
*Attorney, Agent, or Firm*—Joe D. Calhoun

[57] ABSTRACT

An improved wild animal game caller using a tapered and tubular latex-like reed adjustably enveloping an exterior portion of a substantially hollow caller casing, entirely or partially covering an air exit port of said casing. This configuration readily allows almost instantaneous adjustment of sound with ease under field conditions, without disassembly of any part of the caller.

13 Claims, 2 Drawing Sheets tapered latex tube closed end
of cylinder open end
for blowing hole in well of cylinder,
beneath tubular reed hole partially covered
by tubular reed tubular reed can slide back and forth over hole to change pitch of call tubular reed with taper laytex

WILD GAME CALLER

BACKGROUND OF THE INVENTION

The claims of this invention are to be read to include any legally equivalent device or method. The invention relates to the field of wild game callers, especially turkey, duck, geese and other fowl. However, the invention may be used in any caller capable of mimicking the sound of any animal.

Many conventional animal callers use air blown past one or reed members to produce sound. One common assembly involves a flat reed wedged between wood or cork, and air being blown past that assembly to cause the reed to vibrate and thereby produce sound. See, for example, U.S. Pat. No. 3,991,513. The sound of some such callers may be adjusted by adjusting the length of the vibrating portion of the reed. However, such adjustment often requires disassembling the caller in the field, which may be difficult and cumbersome under many hunting conditions, and may otherwise detract from the success or enjoyability of the hunt. Moreover, such interior reed assemblies are susceptible to malfunctioning caused, at least in part, by the accumulation of spit and debris in or around the assembly. It is also difficult to adjust the call sound quickly enough to readily allow customized calls under time-sensitive field conditions.

Another assembly involves an elastomeric reed over an off-center air outlet aperture in the conically tapered end face of a cylindrical caller mouthpiece, said reed being secured by a ring within a circumferential groove of said mouthpiece. See, for example, U.S. Pat. No. 5,090,937. The sound of some such callers may be adjusted by adjusting the positioning and tension of the reed diaphragm over said aperture. However, adjustment often requires disassembling at least parts of the caller such as the ring and reed; such disassembly in the field may be difficult and cumbersome under many hunting conditions, and may otherwise detract from the success or enjoyability of the hunt. Moreover, such interior reed assemblies are susceptible to malfunctioning caused, at least in part, by the accumulation of spit and debris in or around the assembly. It is also difficult to adjust the call sound quickly enough to readily allow customized calls under time-sensitive field conditions.

SUMMARY OF THE INVENTION

The invention improves upon existing animal callers, especially callers using air blown past one or more reeds to produce sound. The primary improvement is the use of a tapered and tubular latex-like reed adjustably enveloping an exterior portion of a substantially hollow caller casing. This configuration readily allows almost instantaneous adjustment of sound with ease under field conditions, without disassembly of any part of the caller.

Another primary improvement of the invention is that it facilitates maintenance of the caller, having minimal parts that are relatively inexpensive and easy to manufacture and assemble.

All of the above are objects of the invention. It is a further object to provide a caller having none of the disadvantages of existing callers. Other improvements and objects will be apparent from the remainder of this application for patent.

BRIEF DESCRIPTION OF DRAWINGS

The following describes the drawings accompanying this application, which are incorporated herein.

Figure 1A:
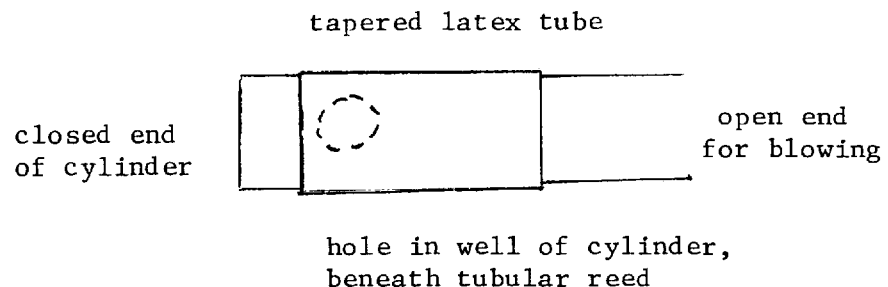
FIGS. 1.a. and 1.b. depict one embodiment of an improved wild game caller, with the tapered tubular reed fully covering the air exit port (FIG. 1.a.) and partially covering said port (FIG. 1.b.).
Figure 1B:
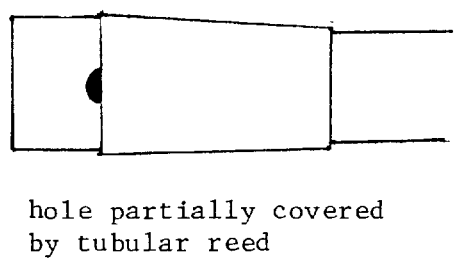
Figure 2:
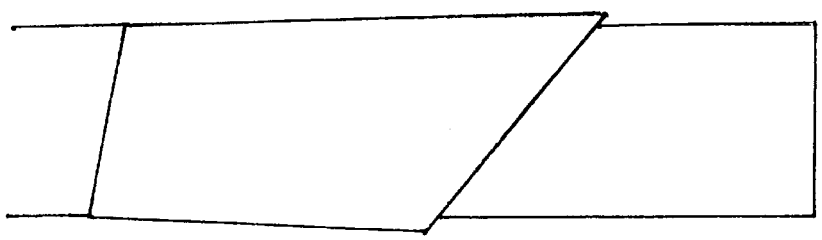
FIG. 2 depicts another embodiment of said caller.
Figure 3:
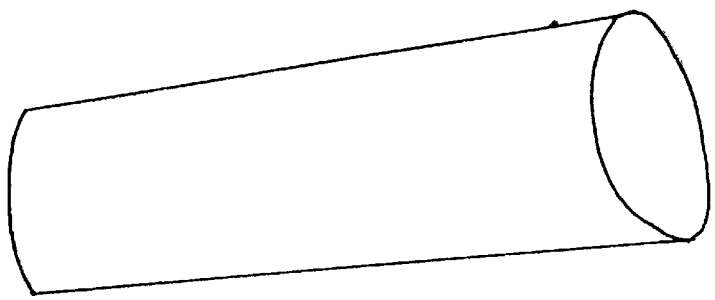
FIG. 3 depicts one version of a tapered tubular reed.
Figure 4:
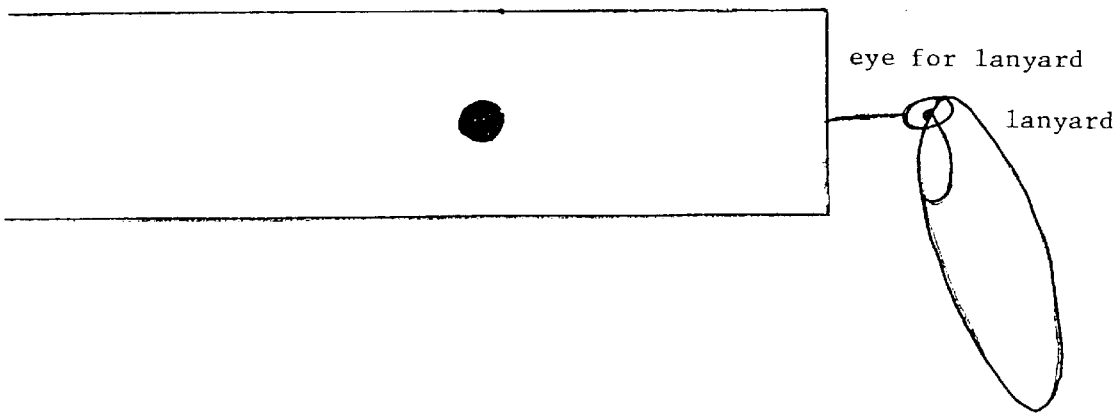
FIG. 4 depicts another embodiment of the invention.

Although these drawings illustrate certain details of certain embodiments, the invention disclosed herein is not limited to only the embodiments so illustrated. The invention disclosed herein may have equally effective or legally equivalent embodiments.

DETAILED DESCRIPTION OF THE INVENTION

Before the present invention is described in detail, it is to be understood that the invention is not limited to the particular configurations, process steps and materials disclosed herein. It is also to be understood that the terminology used herein is not intended to be limiting, since the scope of the present invention will be limited only by the claims and equivalents thereof. Also, as used herein, the singular forms include the plurals, and vice versa, unless the context indicates otherwise.

In most general terms, the invention comprises a casing having an interior surface and an exterior surface, said casing defining an inner air chamber bounded by said interior surface, said casing also defining an opening adapted to allow intake of air blown into said chamber, said casing also defining at least one port adapted to allow exit of air from said chamber; a substantially elastomeric and planar filamentous reed member having at least two opposite ends, a first end loosely stretched across at least some of said port on said exterior surface, and a second end adjustably attached to said exterior surface sufficient to maintain a desired amount of said coverage of said port for a desired length of time, said member having sufficient elasticity that said second end attachment stretches snugly upon said casing to prevent the leakage of air therebetween. Said device produces animal call sounds by the blowing of air into said intake opening, said air traveling into said inner air chamber and exiting said port past said reed member, the adjustment of said sound being dependant upon the positioning of said reed member in relation to said port.

In one embodiment, said casing is configured in the shape selected from the group consisting of essentially hollow cylinders, rectangulo-cuboidal shapes, free-form shapes and combinations thereof. One trait common to each member is such group, justifying inclusion in the group, is the capacity to define an inner air chamber and an air intake entrance and an air exit port. In a preferred embodiment, said casing is essentially a hollow cylinder, said inner chamber extending along the longitudinal axis of said cylinder. Neither the shape of the casing nor the construction materials limit the invention, so long as the structural and functional requirements are present.

The configuration of said air exit port is generally not a limiting factor of the invention, so long as the port provides the functional requirements for directing air for the production of sound.

In another embodiment of the invention, said elastomeric member is selected from the group consisting of latex, rubber, nylon, plastic and combinations thereof. One trait common to each member is such group, justifying inclusion in the group, is the capacity to cover said air exit port, to attach to said exterior surface of said casing snugly enough to prevent the leakage of air anywhere except said first end, and to vibrate to produce sound as air passes past said first end. In another preferred embodiment, said elastomeric member is latex. It may be essentially in the shape of a hollow tube, having an inner diameter sufficient for enveloping a portion of said exterior surface of said casing. Said reed member may also taper outwardly from said second end toward said first end covering said port in whole or in part as desired, said first end enveloping a portion of said exterior surface and positioned to cover said port loosely enough to allow the exit of air blown into and through said device and to thereby produce said animal call sound; said second end of said tubular member may also envelope said cylinder snugly enough to adjustably hold said second end around said cylinder and to prevent the leakage of air anywhere except said first end. Neither the shape of the reed member nor the construction materials limit the invention, so long as the structural and functional requirements are present.

One version of the invention comprises a hollow cylinder approximately 64 milimeters long and approximately 21 mm in diameter, having an exterior surface and an interior surface, said interior surface defining an inner air chamber along the longitudinal axis of said cylinder, said chamber having a diameter of approximately 20 mm, said cylinder having a closed end and an end defining an opening adapted to allow intake of air blown into said chamber, said casing also defining at least one circular port approximately five-sixteenths (5/16ths) of an inch in diameter, adapted to allow exit of air from said chamber. This version also includes a tubular latex reed member in cooperating relationship enveloping a portion of said exterior surface of said cylinder, said tubular reed member having at least two opposite ends, a first end having a portion covering at least some of said port on said exterior surface, and a second end enveloping said exterior surface sufficient to maintain a desired amount of said coverage of said port by said first end for a desired length of time, said tubular member tapering outwardly from said second end toward said first end covering said port in whole or in part as desired, said first end enveloping a portion of said exterior surface and positioned to cover said port loosely enough to allow the exit of air blown into and through said device and to thereby produce said animal call sound, said tubular reed member having sufficient elasticity that said second end attachment stretches snugly around said cylinder to prevent the leakage of air anywhere except said first end. Said device produces animal call sounds by the blowing of air into said intake opening, into said inner air chamber, exiting said port past said tubular latex reed member, the adjustment of said sound being dependant upon the positioning of said tubular latex reed member in relation to said port.

Another version of the invention includes two or more air exit ports. The same reed member may cover more than one port, or more than one reed member may be used.

Optional features of other embodiments include a holding device such as an eyelet attached to said casing, suitable for a cord or other holding means to attach, or a lanyard attached to said casing or eyelet.

The invention also includes the method of making the above callers. Each method comprises the steps of assembling one of the aforementioned casings and reed members. One manner of making the invention is to drill a hole (having a diameter of about 5/16ths inch) in a close-ended cylinder (about the size of an empty twelve gauge shotgun shell casing), about an inch from the closed end. A finger of a latex-like glove may be severed approximately one inch from the tip, and the tip end may likewise be cut off to form the tubular reed element, tapering outward from the tip end. That tubular element may then be stretched over the casing, with the tapered out end covering the hole entirely or partially, held on place by the smaller end snugly enveloping the casing.

I claim:

1. An improved animal caller device comprising:

a closed end casing having an interior surface and an exterior surface, said casing defining an inner air chamber bounded by said interior surface, said casing also defining an opening adapted to allow intake of air blown into said chamber, said casing also defining at least one side port adapted to allow exit of air from said chamber;

a substantially elastomeric and cylindrical filamentous reed member having at least two opposite ends, a first end loosely stretched across at least some of said port on said exterior surface, and a second end slideably attached to said exterior surface sufficient to maintain a desired amount of said coverage of said port for a desired length of time, said member having sufficient elasticity that it stretches snugly upon said casing to prevent the leakage of air anywhere except at said first end;

said device producing animal call sounds by the blowing of air into said intake opening, into said inner air chamber, exiting said port past said reed member, the adjustment of said sound being dependant upon the positioning of said reed member in relation to said port.

2. The device of claim 1 wherein said casing is configured in the shape selected from the group consisting of cylinders.

3. The device of claim 1 wherein said casing is essentially a hollow cylinder, said inner chamber extending along a longitudinal axis of said cylinder.

4. The device of claim 1 wherein said elastomeric member is selected from the group consisting of latex, rubber, nylon, plastic and combinations thereof.

5. The device of claim 1 wherein said elastomeric member is latex.

6. The device of claim 1 wherein said elastomeric member is essentially in the shape of a hollow tube, having an inner diameter sufficient for enveloping a portion of said exterior surface of said casing.

7. The device of claim 6 wherein said tubular member tapers outwardly from said second end toward said first end covering said port in whole or in part as desired, said first end enveloping a portion of said exterior surface and positioned to cover said port loosely enough to allow the exit of air blown into and through said device and to thereby produce said animal call sound.

8. The device of claim 7 wherein said second end of said tubular member envelopes said cylinder snugly enough to adjustably hold said second end around said cylinder and to prevent the leakage of air anywhere except said first end.

9. An improved animal caller device comprising:

a hollow cylinder approximately 64 milimeters long and approximately 21 mm in diameter, having an exterior surface and an interior surface, said interior surface defining an inner air chamber along the longitudinal axis of said cylinder, said chamber having a diameter of approximately 20 mm, said cylinder having a closed end and an end defining an opening adapted to allow intake of air blown into said chamber, said casing also defining at least one circular port approximately five-sixteenths (5/16ths) of an inch in diameter, adapted to allow exit of air from said chamber; and a tubular latex reed member in cooperating relationship enveloping a portion of said exterior surface of said cylinder, said tubular reed member having at least two opposite ends, a first end having a portion covering at least some of said port on said exterior surface, and a second end enveloping said exterior surface sufficient to maintain a desired amount of said coverage of said port by said first end for a desired length of time, said tubular member tapering outwardly from said second end toward said first end covering said port in whole or in part as desired, said first end enveloping a portion of said exterior surface and positioned to cover said port loosely enough to allow the exit of air blown into and through said device and to thereby produce said animal call sound, said tubular reed member having sufficient elasticity that said second end attachment stretches snugly around said cylinder to prevent the leakage of air anywhere except said first end;

said device producing animal call sounds by the blowing of air into said intake opening, into said inner air chamber, exiting said port past said tubular latex reed member, the adjustment of said sound being dependant upon the positioning of said tubular latex reed member in relation to said port.

10. The device of claim 1, having a plurality of said ports.

11. The device of claim 1 further including a means for holding said device.

12. The device of claim 11 wherein said holding means is an eyelet attached to said casing.

13. The device of claim 11 wherein said holding means is a lanyard attached to said casing.

* * * * *